United States Patent [19]

Heminghous et al.

[11] Patent Number: 4,742,683
[45] Date of Patent: May 10, 1988

[54] TURBOCOMPOUND ENGINE

[75] Inventors: William W. Heminghous, Theodore; J. Albert McEachern, Jr., Mobile, both of Ala.

[73] Assignee: Teledyne Industries, Inc., Los Angeles, Calif.

[21] Appl. No.: 897,331

[22] Filed: Aug. 18, 1986

[51] Int. Cl.$^4$ ............................................. F02B 73/00
[52] U.S. Cl. .......................................... 60/716; 60/624
[58] Field of Search ................. 60/606, 607, 624, 711, 60/712, 716

[56] References Cited

U.S. PATENT DOCUMENTS

| 2,848,866 | 8/1958 | Geislinger | 60/624 X |
|---|---|---|---|
| 3,007,302 | 11/1961 | Vincent | 60/624 X |
| 3,688,749 | 9/1972 | Wankel | 123/8.41 |
| 3,918,413 | 11/1975 | Eiermann et al. | 123/8.07 |
| 3,961,199 | 6/1976 | Bronicki | 290/52 |
| 3,993,029 | 11/1976 | Eiermann et al. | 123/8.07 |
| 4,019,324 | 4/1977 | Coxon | 60/624 |
| 4,307,695 | 12/1981 | Vasilantone | 123/559 |
| 4,388,901 | 6/1983 | Kodama et al. | 123/213 |
| 4,422,296 | 12/1983 | Dinger et al. | 60/606 |
| 4,432,206 | 2/1984 | Melchior et al. | 60/606 |
| 4,452,043 | 6/1984 | Wallace | 60/606 X |

FOREIGN PATENT DOCUMENTS 2524620 12/1975 Fed. Rep. of Germany ........ 60/606

Primary Examiner—Stephen F. Husar
Attorney, Agent, or Firm—Gifford, Groh, VanOphem, Sheridan, Sprinkle and Dolgorukov

[57] ABSTRACT

A turbocompound engine having a stratified charge or diesel cycle rotary internal combustion engine, with a first output shaft and a turbine engine with a second output shaft. The first and second output shafts are coupled together so that the shafts rotate in synchronism with each other and provide a rotary output from the turbocompound engine. A valve variably directs air inducted into the engine between the turbine engine and internal combustion engine in dependence upon engine operating conditions.

6 Claims, 1 Drawing Sheet

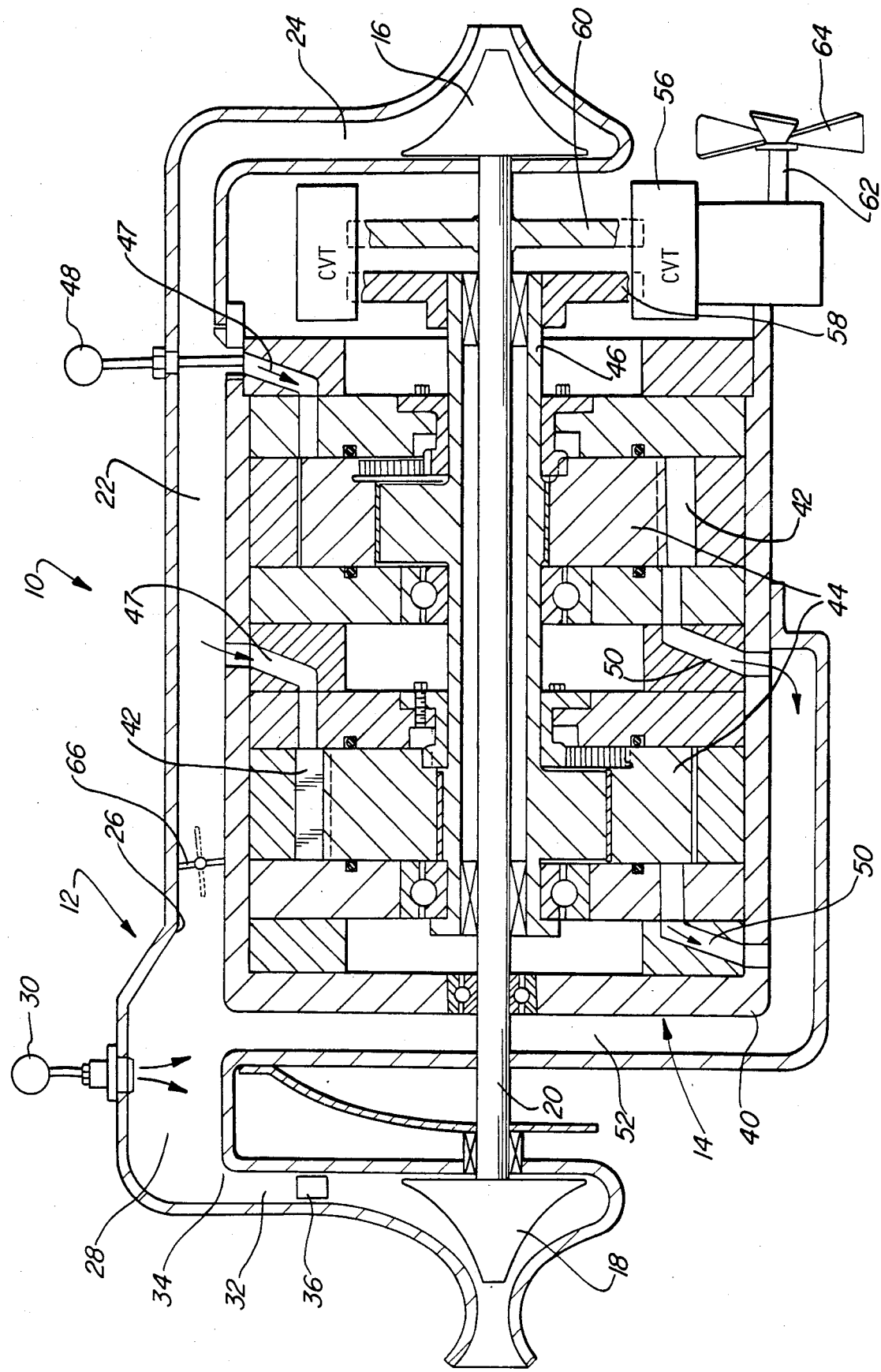

TURBOCOMPOUND ENGINE

BACKGROUND OF THE INVENTION

I. Field of the Invention

The present invention relates generally to engines and, more particularly, to a turbocompound engine having a stratified charge or diesel cycle rotary internal combustion engine, compounded with a turbine engine.

II. Description of the Prior Art

There have been a number of previously known compound engines having two diverse engine types which are coupled together to provide a common output. Such compound engines enjoy many advantages in certain applications. For example, in some operating conditions, one of the diverse engine types is particularly efficient during certain operating conditions while, conversely, the other engine type enjoys certain efficiencies during different operating conditions. For this reason, one engine type complements the other engine type to provide overall engine efficiencies over the range of operating conditions of the compounded engine.

To Applicant's best knowledge, however, there has never previously been a turbo diesel rotary internal combustion engine which has been successfully compounded with a throttleable turbine engine. Furthermore, such a compounded engine would enjoy numerous advantages in weight and size in critical applications, such as aircraft engines.

SUMMARY OF THE PRESENT INVENTION

The present invention provides a turbocompound stratified charge or diesel cycle rotary internal combustion engine and turbine engine which is compact in weight and size and yet highly efficient in operation over a wide range of engine operating conditions.

In brief, the turbocompound engine of the present invention comprises a stratified charge or diesel cycle rotary internal combustion engine. The internal combustion engine includes a housing and a combustion chamber contained within the housing having an inlet and an outlet. A rotary piston is rotatably mounted within the combustion chamber and, when rotatably driven by engine combustion, rotatably drives a first output shaft.

The compound engine further comprises a turbine engine having a turbine compressor, a turbine impeller and a turbine or second output shaft which mechanically connects the compressor and turbine impeller together. A combustion chamber or combustor is fluidly connected in series between the compressor output and the turbine impeller input and has a source of fuel also connected to it. In operation, upon rotation of the turbine shaft, the compressor provides compressed air to the combustor and this compressed air, together with fuel injected into the combustor, is ignited. The resulting combustion products from the combustor exhaust past the turbine impeller to rotatably drive the impeller and, thus, rotatably drive the compressor via the turbine shaft.

The combustion chamber inlet for the internal combustion engine is fluidly connected to a diffuser passageway extending between the turbine compressor and the combustion engine so that the turbine compressor provides compressed air not only to the turbine combustor but also the internal engine combustion chamber. In addition, the outlet or exhaust from the internal engine combustion chamber is also fluidly connected to the combustor. Consequently, the energy from the internal combustion engine exhaust is at least partially recovered by the turbine engine.

The turbine shaft and internal combustion engine output shaft are mechanically or hydrostatically connected together so that these two output shafts rotate in synchronism with each other. Since the turbine output shaft necessarily rotates at much higher speeds than internal combustion engine output shaft, a speed reduction gearing arrangement, such as a planetary gear arrangement, is interposed between the output shafts in order to match their rotational speeds. A continuously variable transmission (CVT) is used to mechanically or hydrostatically connect the turbine and internal combustion output shafts together and the CVT is in turn used to drive a rotary output from the turbocompound engine, such as a turboprop. This can provide relatively fixed output torque and speed over a range of engine operating conditions.

In the preferred form of the invention, a throttle is contained in the diffuser passageway immediately upstream from the combustor. This throttle is movable between a closed and an open position. In its closed position, the throttle diverts most of the compressed air flow through the diffuser assembly to the internal combustion engine so that the internal combustion engine provides a majority of the work output from the turbocompound engine. Conversely, when the throttle is in its fully open position, most of the compressed air flow in the diffuser passageway passes into the combustor, rather than into the combustion chamber for the internal combustion engine. In this case most of the work output from the turbocompound engine is provided by the turbine engine.

Furthermore, the throttle can be variably opened between its fully closed and fully open position to vary the proportionate amount of work output from the compound engine provided by the internal and turbine engines, respectively.

In practice, the throttle is substantially closed at low engine output speeds which are more efficiently handled by the internal combustion engine, and open at higher engine operating speeds at which the turbine engine operates more efficiently than the internal combustion engine.

BRIEF DESCRIPTION OF THE DRAWING

A better understanding of the present invention will be had upon reference to the following detailed description when read in conjunction with the accompanying drawing which is a longitudinal sectional diagrammatic view illustrating a preferred embodiment of the present invention.

DETAILED DESCRIPTION OF A PREFERRED EMBODIMENT OF THE PRESENT INVENTION

With reference to the drawing, a preferred embodiment of the turbocompound engine 10 of the present invention is thereshown and comprises both a turbine engine 12 and an internal combustion engine 14. Both the turbine engine 12 and the internal combustion engine 14 will both be described in greater detail.

The turbine engine 12 comprises a compressor 16 and a turbine impeller 18 which are coaxial but spaced apart from each other. A turbine output shaft 20 drivingly connects the turbine compressor 16 to the turbine impeller 18 so that the impeller 18 and compressor 16 rotate in unison with each other.

A diffuser passageway 22 fluidly connects a pressurized output 24 from the compressor 16 to an inlet 26 of a combustor 28 for the turbine engine 12. A source of fuel 30 is also fluidly connected with the combustor 28 while conventional means (not shown) are used to ignite a fuel air mixture in the combustor 28.

A turbine nozzle passageway 32 in turn fluidly connects an outlet 34 from the combustor 28 to an inlet to the turbine impeller 18. Preferably, a variable nozzle assembly 36 is disposed in the nozzle passageway 32 in order to vary its aerodynamic characteristics.

The diffused passageway 22, combustor 28 and nozzle passageway 32 together form a fluid passage means between the compressor 16 and the turbine 18. In the well known fashion, the compressor 16 when rotatably driven, provides pressurized air to the combustor 28 through the diffuser passageway 22. Fuel from the fuel supply 30 is then also introduced into the combustion 28 and ignited. The resulting hot and expanding combustion products from the combustor 28 then exhaust through the nozzle passageway 32 and past the turbine impeller 18 thus rotatably driving the turbine impeller 18. These exhaust products ultimately exit out through the exhaust 38 thus providing additional thrust for the turbine engine 12.

The internal combustion engine 14 comprises a housing or engine block 40 containing at least one preferably two combustion chambers 42. Each combustion chamber 42, moreover, is designed to receive one rotary piston 44, such as a Wankel rotor.

Each rotary piston 44 is mechanically connected to a sleeve output shaft 46 which is coaxial with the turbine output shaft 20. Furthermore, as shown in the drawing, preferably the turbine output shaft 20 extends entirely through the sleeve output shaft 46 so that the turbine compressor 16 is situated on one end of the sleeve shaft 46 while the turbine impeller 18 is situated adjacent the opposite end of the sleeve shaft 46. Alternatively, the turbine impeller 18 and turbine compressor 16 may be adjacent and the turbine output shaft 20 may extend coaxially with the rotary sleeve output shaft 46.

An inlet passageway 47 fluidly connects each combustion chamber 42 with the diffuser passageway 22. Consequently, highly compressed heated air is provided by the compressor 16 to the combustion chambers 42. Diesel or jet fuel from a fuel source 48 is also provided to each combustion chamber 42. Each combustion chamber 42 further includes an exhaust outlet 50 which is fluidly connected by an exhaust passageway 52 to the turbine engine combustor 28.

In operation, the turbine compressor 16 supplies highly compressed and heated air to the combustion chambers 42 through the diffuser passageway 22 and combustion chamber inlet passageways 47. Simultaneously, fuel from the diesel or jet fuel source 48 is provided to each combustion chamber 42 and self ignites or is ignited in sequence by multiple spark plugs positioned in chamber 42 during the compression cycle. Stratified or self ignition of the diesel fuel 48 within the combustion chambers 42 rotatably drives the sleeve shaft 46 in the well known fashion.

The sleeve output shaft 46 is mechanically connected to a CVT 56 by a gear ring assembly 58. Similarly, the turbine output shaft 20 is mechanically connected to the CVT 56 by a planetary gear arrangement 60 (illustrated only diagrammatically) which may be of any conventional construction. The planetary gear arrangement 60 reduces the rotational speed transmitted by the turbine shaft 20 to the CVT 56 in order to match the rotational speed of the sleeve shaft 46. Typically, a speed reduction of between 6:1 and 15:1 for planetary gear arrangement 60 is required.

The CVT 56 may be of either mechanical or hydraulic construction and mechanically or preferably hydrostatically couples the sleeve output shaft 46 and turbine output shaft 20 together so that they rotate in synchronism with each other. The CVT 56, in turn, rotatably drives an output drive 62 to drive a turboprop 64 or the like.

A throttle 66 is disposed in the diffuser passageway 22 between the combustor 28 and the internal combustion engine inlet passageways 47. The throttle 66 is movable between a closed position, illustrated in solid line, and an open position, illustrated in phantom line. In its closed position, the throttle 66 diverts most of the compressed air flow through the diffuser passageway 22 into the combustion chambers 42 of the internal combustion engine 14. Conversely, in its open position, the throttle 66 allows most of the compressed air flow through the diffuser passageway 22 to directly enter the combustor 28 and bypass the combustion chambers 42.

In practice this throttle 66 is controlled in its position by a microprocessor or central processor unit or electronic control module which senses engine parameters, provides closed loop feedback controlling air flow and fuel flow in order to control both load sharing between the two power units and to control final output speed and torque to predesired levels.

In practice, the turbocompound engine of the present invention achieves many of the advantages over the previously engines. In particular, the throttle 66 allows the ratio of the power output between the turbine and internal combustion engines to be varied in accordance with engine operating conditions. As such, efficient engine operation is achieved over a wide range of different operating conditions.

A further advantage of Applicant's invention is that the exhaust from the internal combustion engine 14 is provided as an inlet to the combustor 28 of a turbine engine. This allows the heat energy from the exhaust of the internal combustion engine 14 to be at least partially recovered by the turbine engine. This in turn results in a more efficient operation of the engine.

A still further advantage of applicant's invention is that the turbocompound engine is relatively compact and lightweight in construction. This is particularly advantageous for weight and size critical applications, such as aircraft engines.

Having described my invention, many modifications thereto will become apparent to those skilled in the art to which it pertains without deviation from the spirit of the invention as defined by the scope of the appended claims.

We claim:

1. A turbocompound engine comprising
   a diesel cycle rotary internal combustion chamber having a first output shaft,
   a turbine engine having a second output shaft,
   said first and second shafts being coaxial with said second shaft extending through said first shaft,
   means for connecting said output shafts together so that said shafts rotate in synchronism with each other, and means driven by said connecting means which provides a rotary output from said turbocompound engine, wherein said turbine engine comprises a turbine, a compressor, a combustor and fluid conduit means for fluidly connecting said combustor in series between said turbine and said compressor, and wherein said internal combustion engine comprises a combustion chamber having an inlet and an outlet, and comprising means for fluidly connecting said combustion chamber inlet to said fluid conduit means between said compressor and said combustion chamber, means to fluidly connect said combustion chamber outlet to said combustor, and valve means for variably dividing fluid flow through said fluid conduit means between said combustor and said combustion chamber inlet.

2. The invention as defined in claim 1 wherein said connecting means comprises a planetary gear arrangement.

3. The invention as defined in claim 1 wherein said connecting means comprises a hydrostatic drive.

4. The invention as defined in claim 1 wherein said connecting means comprises a continuously variable transmission having means for speed synchronizing said first and second shaft.

5. The invention as defined in claim 4 wherein said transmission means comprises a fluid coupling.

6. The invention as defined in claim 1 wherein said turbine shaft rotates between six and fifteen times faster than said output shaft at all operating conditions of the turbocompound engine.

* * * * *